United States Patent
Wang et al.

(10) Patent No.: US 11,948,390 B1
(45) Date of Patent: Apr. 2, 2024

(54) DOG NOSE PRINT RECOGNITION METHOD AND SYSTEM

(71) Applicant: XINGCHONG KINGDOM (BEIJING) TECHNOLOGY CO., LTD, Beijing (CN)

(72) Inventors: Yiduan Wang, Beijing (CN); Cheng Song, Beijing (CN); Baoguo Liu, Xianyang (CN); Weipeng Guo, Foshan (CN)

(73) Assignee: XINGCHONG KINGDOM (BEIJING) TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/262,862

(22) PCT Filed: Jun. 30, 2023

(86) PCT No.: PCT/CN2023/104960
§ 371 (c)(1),
(2) Date: Jul. 25, 2023

(51) Int. Cl.
*G06V 40/10* (2022.01)
*G06V 10/24* (2022.01)
(Continued)

(52) U.S. Cl.
CPC .............. *G06V 40/10* (2022.01); *G06V 10/24* (2022.01); *G06V 10/267* (2022.01); *G06V 10/44* (2022.01);
(Continued)

(58) Field of Classification Search
CPC .... G06V 10/70; G06V 10/761; G06V 10/751; G06V 10/44; G06V 10/24; G06V 40/10; G06V 10/267
See application file for complete search history.

(56) References Cited

U.S. PATENT DOCUMENTS

| 2016/0110383 | A1* | 4/2016 | Mowry | A01K 15/021 |
| | | | | 707/758 |
| 2019/0297252 | A1* | 9/2019 | Choi | G06V 40/10 |
| 2021/0089763 | A1* | 3/2021 | Shamsi | G06V 40/10 |

FOREIGN PATENT DOCUMENTS

| CN | 110909618 A | 3/2020 |
| CN | 114332938 A * | 4/2022 |

(Continued)

OTHER PUBLICATIONS

CNIPA Office Action, Application CN CN202211288489.8, dated Feb. 11, 2022, pp. 1-4.

(Continued)

*Primary Examiner* — Shaghayegh Azima
(74) *Attorney, Agent, or Firm* — Addison D. Ault; Richard P. Moerschell; IPGentleman Intellectual Property Services, LLC (57) ABSTRACT

The present disclosure provides a dog nose print recognition method and system. The dog nose print recognition method includes: collecting a nose image of a dog, acquiring the nose image, and processing the nose image to obtain a plurality of regional images to be recognized; performing key point detection on the plurality of regional images to be recognized to obtain key points corresponding to the regional images to be recognized, and using the key points to perform alignment processing of the regional images to be recognized to obtain aligned regional images to be recognized; and performing dog nose print feature vector extraction and recognition on the aligned regional images to be recognized, and determining a dog identity recognition result through the dog nose print feature vector extraction and recognition. The system includes modules corresponding to the steps of the method.

2 Claims, 2 Drawing Sheets

(51) Int. Cl.
*G06V 10/26* (2022.01)
*G06V 10/44* (2022.01)
*G06V 10/70* (2022.01)
*G06V 10/74* (2022.01)
*G06V 10/75* (2022.01)

(52) U.S. Cl.
CPC ............ *G06V 10/70* (2022.01); *G06V 10/751* (2022.01); *G06V 10/761* (2022.01)

(56) References Cited

FOREIGN PATENT DOCUMENTS

| | | | | |
|---|---|---|---|---|
| CN | 115393904 B | * | 5/2023 | |
| JP | 2007135501 A | | 6/2007 | |
| WO | WO-2022133422 A1 | * | 6/2022 | ............. G06V 40/10 |

OTHER PUBLICATIONS

CNIPA Office Action, Application CN CN202211288489.8, dated Feb. 11, 2022, English translation, pp. 1-5.
Yan, L., Machine translation of CN110909618A, generated Jul. 25, 2023, pp. 1-34.
Tetsuya, H., Machine translation of JP2007135501A, generated Jul. 25, 2023, pp. 1-50.

* cited by examiner

DOG NOSE PRINT RECOGNITION METHOD AND SYSTEM

CROSS-REFERENCE TO RELATED APPLICATION

This application is a Section 371 National Stage Application of International Application No. PCT/CN2023/104960, filed on Jun. 30, 2023, entitled "Dog Nose Print Recognition Method and System", which claims priority to Chinese Application No. CN 202211288489.8, filed on Oct. 20, 2022, incorporated herein by reference in their entirety.

TECHNICAL FIELD

The present disclosure provides a dog nose print recognition method and a dog nose print recognition system, relating to the field of dog nose print recognition.

BACKGROUND

At present, more and more people have dogs in cities, resulting in more and more dogs in cities. Therefore, there are often problems such as stray dogs cannot be identified, and owners of biting dogs cannot be found. At present, there are mainly two existing solutions, one is the application of a dog certificate, and the other is to inject a chip into the dog. Although the first solution has already been implemented in China for many years, its penetration rate is not very high due to the need to re-examine and pay a certain fee every year. The second solution is harmful to the pet itself, and not everyone can recognize the chip, instead it can only be recognized with the assistance of professional equipment from specific organization, thereby having great limitations.

Therefore, the dog identity recognition methods in the prior art have the disadvantages of low feasibility and great damage to the dog. In the prior art, it lacks an effective method for dog identity recognition.

SUMMARY

The present disclosure provides a dog nose print recognition method and system, intended to solve the problems of low feasibility and low identity recognition effectiveness of the dog identity recognition method in the prior art. The adopted technical solutions are as follows:

A dog nose print recognition method, comprising:
  collecting a nose image of a dog, acquiring the nose image, and processing the nose image to obtain a plurality of regional images to be recognized;
  performing key point detection on the plurality of regional images to be recognized to obtain key points corresponding to the regional images to be recognized, and using the key points to perform alignment processing of the regional images to be recognized to obtain aligned regional images to be recognized; and
  performing dog nose print feature vector extraction and recognition on the aligned regional images to be recognized, and determining a dog identity recognition result through the dog nose print feature vector extraction and recognition.

According to some embodiments of the present disclosure, the step of processing the nose image to obtain a plurality of regional images to be recognized comprises:
  performing an edge contour process to the nose image to obtain a nose overall region bounded by a nose contour;
  performing an image region division process to the nose overall region to obtain the plurality of regional images to be recognized.

According to some embodiments of the present disclosure, the step of performing an image region division process to the nose overall region to obtain the plurality of regional images to be recognized comprises:
  recognizing and marking contour lines of a left nostril and a right nostril in the nose overall region to obtain a position of a contour line of the left nostril and a position of a contour line of the right nostril, and a center line between the left nostril and the right nostril, and taking the center line between the left nostril and the right nostril as a center line of the nose overall region;
  lining a highest point of the contour line of the left nostril with a highest point of the contour line of the right nostril to obtain a horizontal higher line, and extracting a position of an intersection point of the horizontal higher line and the center line of the nose overall region as a first intersection point position;
  extracting a position of an intersection point of the center line of the nose overall region and an upper contour line of the nose overall region as a second intersection point position;
  lining the highest point of the contour line of the left nostril and the highest point of the contour line of the right nostril with the second intersection point position respectively, to respectively obtain an included angle between a line connecting the highest point of the contour line of the left nostril with the second intersection point position and the horizontal higher line, and an included angle between a line connecting the highest point of the contour line of the right nostril with the second intersection point position and the horizontal higher line;
  utilizing the included angles and a center point-included angle determination model to obtain a position of a center point on the center line of the nose overall region; simultaneously, utilizing a distance between the first intersection point position and the second intersection point position in conjunction with a radius determination model to obtain a radius, wherein the center point-included angle determination model and the radius determination model are as follows respectively:

$$V = \left(1 - \frac{\min(\alpha_1,\alpha_2) - \alpha_0}{\max(\alpha_1,\alpha_2) - \alpha_0}\right) \cdot \frac{\min(\alpha_1,\alpha_2)}{1.29 \cdot \max(\alpha_1,\alpha_2)} \cdot \left(\alpha_1 + \frac{\min(\alpha_1,\alpha_2) - \alpha_0}{\alpha_0} \cdot \alpha_2\right)$$

$$R = \left(1 + \frac{\min(\alpha_1,\alpha_2)}{1.34 \cdot \max(\alpha_1,\alpha_2)}\right) \cdot L$$

wherein V represents an included angle between a line connecting the center point with the highest point of the contour line of the left nostril or the highest point of the contour line of the right nostril and the horizontal higher line; $\alpha_1$ and $\alpha_2$ respectively represent the included angle between the line connecting the highest point of the contour line of the left nostril with the second intersection point position and the horizontal higher line, and the included angle between the line connecting the highest point of the contour line of the right nostril with the second intersection point position and the horizontal higher line; $\alpha_0$ represents a benchmark comparison value of included angle with a value range of 17.8°-25.2°; and if $\alpha_1$ and $\alpha_2$ are equal, then $(\min(\alpha_1, \alpha_2)-\alpha_0)/(\max(\alpha_1, \alpha_2)-\alpha_0)=0.1$; R represents the radius; L represents the first the distance between the first intersection point position and the second intersection point position;

taking the center point as a circle center to form a first region to be recognized based on the radius, and utilizing the first region to be recognized to intercept a first regional image to be recognized in the nose overall region;

lining a lowest point of the contour line of the left nostril with a lowest point of the contour line of the right nostril to obtain a horizontal lower line, and extracting a position of an intersection point of the horizontal lower line and the center line of the nose overall region as a third intersection point position;

extracting a shortest distance between the lowest point of the contour line of the left nostril and the center line of the nose overall region and a shortest distance between the lowest point of the contour line of the right nostril and the center line of the nose overall region, respectively; taking the third intersection point position as a circle center, taking the shortest distance between the lowest point of the contour line of the left nostril and the center line of the nose overall region as a major axis and taking the shortest distance between the lowest point of the contour line of the right nostril and the center line of the nose overall region as a minor axis, to form a longitudinal elliptical region, utilizing the longitudinal elliptical region as a second region to be recognized, and utilizing the second region to be recognized to intercept a second regional image to be recognized in the nose overall region.

According to some embodiments of the present disclosure, the step of performing key point detection on the plurality of regional images to be recognized to obtain key points corresponding to the regional images to be recognized, and using the key points to perform alignment processing of the regional images to be recognized to obtain aligned regional images to be recognized comprises:

inputting the plurality of regional images to be recognized into a trained key point detection model in sequence to obtain key points corresponding to the regional image to be recognized;

marking the key points corresponding to each regional image to be recognized with a regional label to obtain the key points with the regional label corresponding to the regional image to be recognized;

extracting a preset key point reference region corresponding to the regional image to be recognized, wherein the key point reference region has the same label as the regional label;

planning the regional image to be recognized with the key points with the regional label to the key point reference region with the same regional label, according to a principle of regional label consistency;

aligning the key points corresponding to the regional image to be recognized with key point reference positions contained in the corresponding key point reference region, and aligning the plurality of regional images to be recognized to standard positions of the regional images to be recognized by means of aligning the key points with the key point reference positions.

According to some embodiments of the present disclosure, the step of performing dog nose print feature vector extraction and recognition on the aligned regional images to be recognized, and determining a dog identity recognition result through the dog nose print feature vector extraction and recognition comprises:

inputting the aligned regional images to be recognized into a trained feature extraction model to extract a dog nose print feature vector, to obtain a nose print feature vectors of a dog to be tested;

comparing the nose print feature vector of the dog to be tested with a reference dog nose print feature vector stored in a preset dog nose print feature vector library in terms of distance, and taking the reference dog nose print feature vector with closest distance to the nose print feature vector of the dog to be tested as a target dog nose print feature vector;

selecting the target dog nose print feature vector, and retrieving a dog identity information corresponding to the target dog nose print feature vector from the dog nose print feature vector library.

A dog nose print recognition system, comprising:

an image acquisition module, configured for collecting a nose image of a dog, acquiring the nose image, and processing the nose image to obtain a plurality of regional images to be recognized;

a key point acquisition module, configured for performing key point detection on the plurality of regional images to be recognized to obtain key points corresponding to the regional images to be recognized, and using the key points to perform alignment processing of the regional images to be recognized to obtain aligned regional images to be recognized; and a recognition module, configured for performing dog nose print feature vector extraction and recognition on the aligned regional images to be recognized, and determining a dog identity recognition result through the dog nose print feature vector extraction and recognition.

According to some embodiments of the present disclosure, the image acquisition module comprises:

a contour processing module, configured for performing an edge contour process to the nose image to obtain a nose overall region bounded by a nose contour;

a division processing module, configured for performing an image region division process to the nose overall region to obtain the plurality of regional images to be recognized.

According to some embodiments of the present disclosure, the division processing module comprises:

a first position processing module, configured for recognizing and marking contour lines of a left nostril and a right nostril in the nose overall region to obtain a position of a contour line of the left nostril and a position of a contour line of the right nostril, and a center line between the left nostril and the right nostril, and taking the center line between the left nostril and the right nostril as a center line of the nose overall region;

a first intersection point position acquisition module, configured for lining a highest point of the contour line of the left nostril with a highest point of the contour line of the right nostril to obtain a horizontal higher line, and extracting a position of an intersection point of the horizontal higher line and the center line of the nose overall region as a first intersection point position;

a second intersection point position acquisition module, configured for extracting a position of an intersection point of the center line of the nose overall region and an upper contour line of the nose overall region as a second intersection point position;

a second position processing module, configured for lining the highest point of the contour line of the left nostril and the highest point of the contour line of the right nostril with the second intersection point position respectively, to respectively obtain an included angle between a line connecting the highest point of the contour line of the left nostril with the second intersection point position and the horizontal higher line, and an included angle between a line connecting the highest point of the contour line of the right nostril with the second intersection point position and the horizontal higher line;

a data parameter determination module, configured for utilizing the included angles and a center point-included angle determination model to obtain a position of a center point on the center line of the nose overall region; simultaneously, utilizing a distance between the first intersection point position and the second intersection point position in conjunction with a radius determination model to obtain a radius, wherein the center point-included angle determination model and the radius determination model are as follows respectively:

$$V = \left(1 - \frac{\min(\alpha_1, \alpha_2) - \alpha_0}{\max(\alpha_1, \alpha_2) - \alpha_0}\right) \cdot \frac{\min(\alpha_1, \alpha_2)}{1.29 \cdot \max(\alpha_1, \alpha_2)} \cdot \left(\alpha_1 + \frac{\min(\alpha_1, \alpha_2) - \alpha_0}{\alpha_0} \cdot \alpha_2\right)$$

$$R = \left(1 + \frac{\min(\alpha_1, \alpha_2)}{1.34 \cdot \max(\alpha_1, \alpha_2)}\right) \cdot L$$

wherein V represents an included angle between a line connecting the center point with the highest point of the contour line of the left nostril or the highest point of the contour line of the right nostril and the horizontal higher line; $\alpha_1$ and $\alpha_2$ respectively represent the included angle between the line connecting the highest point of the contour line of the left nostril with the second intersection point position and the horizontal higher line, and the included angle between the line connecting the highest point of the contour line of the right nostril with the second intersection point position and the horizontal higher line; $\alpha_0$ represents a benchmark comparison value of included angle with a value range of 17.8°-25.2°; and if $\alpha_1$ and $\alpha_2$ are equal, then $(\min(\alpha_1, \alpha_2) - \alpha_0)/(\max(\alpha_1, \alpha_2) - \alpha_0) = 0.1$; R represents the radius; L represents the first the distance between the first intersection point position and the second intersection point position;

a first to-be-recognized regional image acquisition module, configured for taking the center point as a circle center to form a first region to be recognized based on the radius, and utilizing the first region to be recognized to intercept a first regional image to be recognized in the nose overall region;

a third intersection point position acquisition module, configured for lining a lowest point of the contour line of the left nostril with a lowest point of the contour line of the right nostril to obtain a horizontal lower line, and extracting a position of an intersection point of the horizontal lower line and the center line of the nose overall region as a third intersection point position;

a second to-be-recognized regional image acquisition module, configured for extracting a shortest distance between the lowest point of the contour line of the left nostril and the center line of the nose overall region and a shortest distance between the lowest point of the contour line of the right nostril and the center line of the nose overall region, respectively; taking the third intersection point position as a circle center, taking the shortest distance between the lowest point of the contour line of the left nostril and the center line of the nose overall region as a major axis and taking the shortest distance between the lowest point of the contour line of the right nostril and the center line of the nose overall region as a minor axis, to form a longitudinal elliptical region, utilizing the longitudinal elliptical region as a second region to be recognized, and utilizing the second region to be recognized to intercept a second regional image to be recognized in the nose overall region.

According to some embodiments of the present disclosure, the key point acquisition module comprises:

a key point determination module, configured for inputting the plurality of regional images to be recognized into a trained key point detection model in sequence to obtain key points corresponding to the regional image to be recognized;

a first labeling module, configured for marking the key points corresponding to each regional image to be recognized with a regional label to obtain the key points with the regional label corresponding to the regional image to be recognized;

a region extraction module, configured for extracting a preset key point reference region corresponding to the regional image to be recognized, wherein the key point reference region has the same label as the regional label;

a second labeling module, configured for planning the regional image to be recognized with the key points with the regional label to the key point reference region with the same regional label, according to a principle of regional label consistency;

an alignment module, configured for aligning the key points corresponding to the regional image to be recognized with key point reference positions contained in the corresponding key point reference region, and aligning the plurality of regional images to be recognized to standard positions of the regional images to be recognized by means of aligning the key points with the key point reference positions.

According to some embodiments of the present disclosure, the recognition module comprises:

a vector extraction module, configured for inputting the aligned regional images to be recognized into a trained feature extraction model to extract a dog nose print feature vector, to obtain a nose print feature vectors of a dog to be tested;

a feature comparison module, configured for comparing the nose print feature vector of the dog to be tested with a reference dog nose print feature vector stored in a preset dog nose print feature vector library in terms of distance, and taking the reference dog nose print feature vector with closest distance to the nose print feature vector of the dog to be tested as a target dog nose print feature vector;

an identity recognition module, configured for selecting the target dog nose print feature vector, and retrieving a dog identity information corresponding to the target dog nose print feature vector from the dog nose print feature vector library.

The present disclosure has the following beneficial effects:

The dog nose print recognition method and system proposed by the present disclosure extract a key recognition region of the dog's nose by setting a plurality of regions to be recognized, and realize recognition and detection of dog nose print by recognizing and detecting partial features of the key recognition region. In this way, it can effectively improve the accuracy and efficiency of dog image recognition while reducing the amount of data to be detected.

DETAILED DESCRIPTION OF EMBODIMENTS

The embodiments of the present disclosure will be described below in conjunction with the accompanying drawings. It should be understood that the embodiments described here are only intended to illustrate and explain the present disclosure, but not intended to limit the present disclosure.

Figure 1:
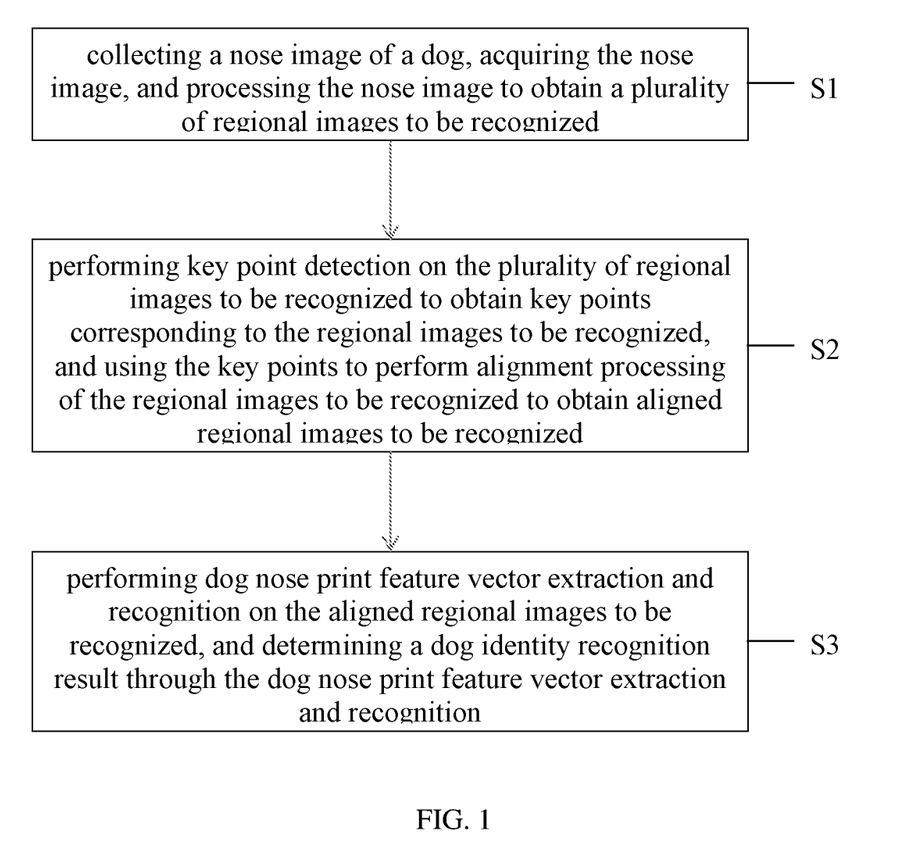
FIG. 1 is a flow chart of a dog nose print recognition method according to the present disclosure.

An embodiment of the present disclosure proposes a dog nose print recognition method, as shown in FIG. 1, the dog nose print recognition method includes:

S1: collecting a nose image of a dog, acquiring the nose image, and processing the nose image to obtain a plurality of regional images to be recognized;

S2: performing key point detection on the plurality of regional images to be recognized to obtain key points corresponding to the regional images to be recognized, and using the key points to perform alignment processing of the regional images to be recognized to obtain aligned regional images to be recognized; and S3: performing dog nose print feature vector extraction and recognition on the aligned regional images to be recognized, and determining a dog identity recognition result through the dog nose print feature vector extraction and recognition.

The working principle of the above-mentioned technical solution is as follows: firstly, collect a nose image of a dog, acquire the nose image, and process the nose image to obtain a plurality of regional images to be recognized; then, perform key point detection on the plurality of regional images to be recognized to obtain key points corresponding to the regional images to be recognized, and use the key points to perform alignment processing of the regional images to be recognized to obtain aligned regional images to be recognized; and finally, perform dog nose print feature vector extraction and recognition on the aligned regional images to be recognized, and determine a dog identity recognition result through the dog nose print feature vector extraction and recognition.

The effect of the above technical solution is: the dog nose print recognition method proposed in this embodiment extracts a key recognition region of the dog's nose by setting a plurality of regions to be recognized, and realizes recognition and detection of dog nose print by recognizing and detecting partial features of the key recognition region. In this way, it can effectively improve the accuracy and efficiency of dog image recognition while reducing the amount of data to be detected.

In one embodiment of the present disclosure, the step of processing the nose image to obtain a plurality of regional images to be recognized comprises:

S101: performing an edge contour process to the nose image to obtain a nose overall region bounded by a nose contour;

S102: performing an image region division process to the nose overall region to obtain the plurality of regional images to be recognized.

Herein, the step of performing an image region division process to the nose overall region to obtain the plurality of regional images to be recognized comprises:

S1021: recognizing and marking contour lines of a left nostril and a right nostril in the nose overall region to obtain a position of a contour line of the left nostril and a position of a contour line of the right nostril, and a center line between the left nostril and the right nostril, and taking the center line between the left nostril and the right nostril as a center line of the nose overall region;

S1022: lining a highest point of the contour line of the left nostril with a highest point of the contour line of the right nostril to obtain a horizontal higher line, and extracting a position of an intersection point of the horizontal higher line and the center line of the nose overall region as a first intersection point position;

S1023: extracting a position of an intersection point of the center line of the nose overall region and an upper contour line of the nose overall region as a second intersection point position;

S1024: lining the highest point of the contour line of the left nostril and the highest point of the contour line of the right nostril with the second intersection point position respectively, to respectively obtain an included angle between a line connecting the highest point of the contour line of the left nostril with the second intersection point position and the horizontal higher line, and an included angle between a line connecting the highest point of the contour line of the right nostril with the second intersection point position and the horizontal higher line;

S1025: utilizing the included angles and a center point-included angle determination model to obtain a position of a center point on the center line of the nose overall region; simultaneously, utilizing a distance between the first intersection point position and the second intersection point position in conjunction with a radius determination model to obtain a radius, wherein the center point-included angle determination model and the radius determination model are as follows respectively:

$$V = \left(1 - \frac{\min(\alpha_1, \alpha_2) - \alpha_0}{\max(\alpha_1, \alpha_2) - \alpha_0}\right) \cdot \frac{\min(\alpha_1, \alpha_2)}{1.29 \cdot \max(\alpha_1, \alpha_2)} \cdot \left(\alpha_1 + \frac{\min(\alpha_1, \alpha_2) - \alpha_0}{\alpha_0} \cdot \alpha_2\right)$$

$$R = \left(1 + \frac{\min(\alpha_1, \alpha_2)}{1.34 \cdot \max(\alpha_1, \alpha_2)}\right) \cdot L$$

wherein V represents an included angle between a line connecting the center point with the highest point of the contour line of the left nostril or the highest point of the contour line of the right nostril and the horizontal higher line; $\alpha_1$ and $\alpha_2$ respectively represent the included angle between the line connecting the highest point of the contour line of the left nostril with the second intersection point position and the horizontal higher line, and the included angle between the line connecting the highest point of the contour line of the right nostril with the second intersection point position and the horizontal higher line; $\alpha_0$ represents a benchmark comparison value of included angle with a value range of 17.8°-25.2°; and if $\alpha_1$ and $\alpha_2$ are equal, then $(\min(\alpha_1, \alpha_2)-\alpha_0)/(\max(\alpha_1, \alpha_2)-\alpha_0)=0.1$; R represents the radius; L represents the first the distance between the first intersection point position and the second intersection point position;

S1026: taking the center point as a circle center to form a first region to be recognized based on the radius, and utilizing the first region to be recognized to intercept a first regional image to be recognized in the nose overall region;

S1027: lining a lowest point of the contour line of the left nostril with a lowest point of the contour line of the right nostril to obtain a horizontal lower line, and extracting a position of an intersection point of the horizontal lower line and the center line of the nose overall region as a third intersection point position;

S1028: extracting a shortest distance between the lowest point of the contour line of the left nostril and the center line of the nose overall region and a shortest distance between the lowest point of the contour line of the right nostril and the center line of the nose overall region, respectively; taking the third intersection point position as a circle center, taking the shortest distance between the lowest point of the contour line of the left nostril and the center line of the nose overall region as a major axis and taking the shortest distance between the lowest point of the contour line of the right nostril and the center line of the nose overall region as a minor axis, to form a longitudinal elliptical region, utilizing the longitudinal elliptical region as a second region to be recognized, and utilizing the second region to be recognized to intercept a second regional image to be recognized in the nose overall region.

The working principle of the above technical solution is as follows: firstly, perform an edge contour process to the nose image to obtain a nose overall region bounded by a nose contour; then, perform an image region division process to the nose overall region to obtain the plurality of regional images to be recognized.

Specifically the step of performing an image region division process to the nose overall region to obtain the plurality of regional images to be recognized comprises:

firstly, recognize and mark contour lines of a left nostril and a right nostril in the nose overall region to obtain a position of a contour line of the left nostril and a position of a contour line of the right nostril, and a center line between the left nostril and the right nostril, and take the center line between the left nostril and the right nostril as a center line of the nose overall region;

then, line a highest point of the contour line of the left nostril with a highest point of the contour line of the right nostril to obtain a horizontal higher line, and extract a position of an intersection point of the horizontal higher line and the center line of the nose overall region as a first intersection point position; extract a position of an intersection point of the center line of the nose overall region and an upper contour line of the nose overall region as a second intersection point position; line the highest point of the contour line of the left nostril and the highest point of the contour line of the right nostril with the second intersection point position respectively, to respectively obtain an included angle between a line connecting the highest point of the contour line of the left nostril with the second intersection point position and the horizontal higher line, and an included angle between a line connecting the highest point of the contour line of the right nostril with the second intersection point position and the horizontal higher line;

then, utilize the included angles and a center point-included angle determination model to obtain a position of a center point on the center line of the nose overall region; simultaneously, utilize a distance between the first intersection point position and the second intersection point position in conjunction with a radius determination model to obtain a radius; take the center point as a circle center to form a first region to be recognized based on the radius, and utilize the first region to be recognized to intercept a first regional image to be recognized in the nose overall region; line a lowest point of the contour line of the left nostril with a lowest point of the contour line of the right nostril to obtain a horizontal lower line, and extract a position of an intersection point of the horizontal lower line and the center line of the nose overall region as a third intersection point position;

finally, extract a shortest distance between the lowest point of the contour line of the left nostril and the center line of the nose overall region and a shortest distance between the lowest point of the contour line of the right nostril and the center line of the nose overall region, respectively; take the third intersection point position as a circle center, take the shortest distance between the lowest point of the contour line of the left nostril and the center line of the nose overall region as a major axis and take the shortest distance between the lowest point of the contour line of the right nostril and the center line of the nose overall region as a minor axis, to form a longitudinal elliptical region, utilize the longitudinal elliptical region as a second region to be recognized, and utilize the second region to be recognized to intercept a second regional image to be recognized in the nose overall region.

The effect of the above-mentioned technical solution is: the representativeness and accuracy of image acquisition of the plurality of regional images to be recognized of the dog nose print can be effectively improved through the above-mentioned method, and in this way, the amount of the data to be detected (feature vectors and key points) can be effectively reduced, and the efficiency of data detection can be effectively improved through the reduction of the amount of data, and the problem of low response speed of dog nose print recognition caused by too much data to be detected and compared can be prevented. Further, the positions obtained by the above formula and method can effectively improve its versatility for the shape and size of any dog's nose, and can ensure that the regional images to be recognized with high accuracy and rationality can be obtained for any dog's nose shape and size, and the regional images to be recognized contain a sufficient amount of data (feature vectors and key points) that represent the characteristic of the dog nose print, which can effectively improve the accuracy of dog nose print recognition while reducing the amount of data to be processed.

In one embodiment of the present disclosure, the step of performing key point detection on the plurality of regional images to be recognized to obtain key points corresponding to the regional images to be recognized, and using the key points to perform alignment processing of the regional images to be recognized to obtain aligned regional images to be recognized comprises:

S201: inputting the plurality of regional images to be recognized into a trained key point detection model in sequence to obtain key points corresponding to the regional image to be recognized;

S202: marking the key points corresponding to each regional image to be recognized with a regional label to obtain the key points with the regional label corresponding to the regional image to be recognized;

S203: extracting a preset key point reference region corresponding to the regional image to be recognized, wherein the key point reference region has the same label as the regional label;

S204: planning the regional image to be recognized with the key points with the regional label to the key point reference region with the same regional label, according to a principle of regional label consistency;

S205: aligning the key points corresponding to the regional image to be recognized with key point reference positions contained in the corresponding key point reference region, and aligning the plurality of regional images to be recognized to standard positions of the regional images to be recognized by means of aligning the key points with the key point reference positions.

The working principle of the above technical solution is as follows: firstly, input the plurality of regional images to be recognized into a trained key point detection model in sequence to obtain key points corresponding to the regional image to be recognized; then, mark the key points corresponding to each regional image to be recognized with a regional label to obtain the key points with the regional label corresponding to the regional image to be recognized; then, extract a preset key point reference region corresponding to the regional image to be recognized, wherein the key point reference region has the same label as the regional label; after that, plan the regional image to be recognized with the key points with the regional label to the key point reference region with the same regional label, according to a principle of regional label consistency; finally, align the key points corresponding to the regional image to be recognized with key point reference positions contained in the corresponding key point reference region, and align the plurality of regional images to be recognized to standard positions of the regional images to be recognized by means of aligning the key points with the key point reference positions.

The effect of the above technical solution is: the above method can effectively improve the accuracy and image recognition efficiency of dog image recognition while reducing the amount of data to be detected.

In one embodiment of the present disclosure, the step of performing dog nose print feature vector extraction and recognition on the aligned regional images to be recognized, and determining a dog identity recognition result through the dog nose print feature vector extraction and recognition comprises:

S301: inputting the aligned regional images to be recognized into a trained feature extraction model to extract a dog nose print feature vector, to obtain a nose print feature vectors of a dog to be tested;

S302: comparing the nose print feature vector of the dog to be tested with a reference dog nose print feature vector stored in a preset dog nose print feature vector library in terms of distance, and taking the reference dog nose print feature vector with closest distance to the nose print feature vector of the dog to be tested as a target dog nose print feature vector;

S303: selecting the target dog nose print feature vector, and retrieving a dog identity information corresponding to the target dog nose print feature vector from the dog nose print feature vector library.

The working principle of the above technical solution is as follows: firstly, input the aligned regional images to be recognized into a trained feature extraction model to extract a dog nose print feature vector, to obtain a nose print feature vectors of a dog to be tested; then, compare the nose print feature vector of the dog to be tested with a reference dog nose print feature vector stored in a preset dog nose print feature vector library in terms of distance, and take the reference dog nose print feature vector with closest distance to the nose print feature vector of the dog to be tested as a target dog nose print feature vector; finally, select the target dog nose print feature vector, and retrieve a dog identity information corresponding to the target dog nose print feature vector from the dog nose print feature vector library.

The effect of the above technical solution is: the above method can effectively improve the accuracy and image recognition efficiency of dog image recognition while reducing the amount of data to be detected.

Figure 2:
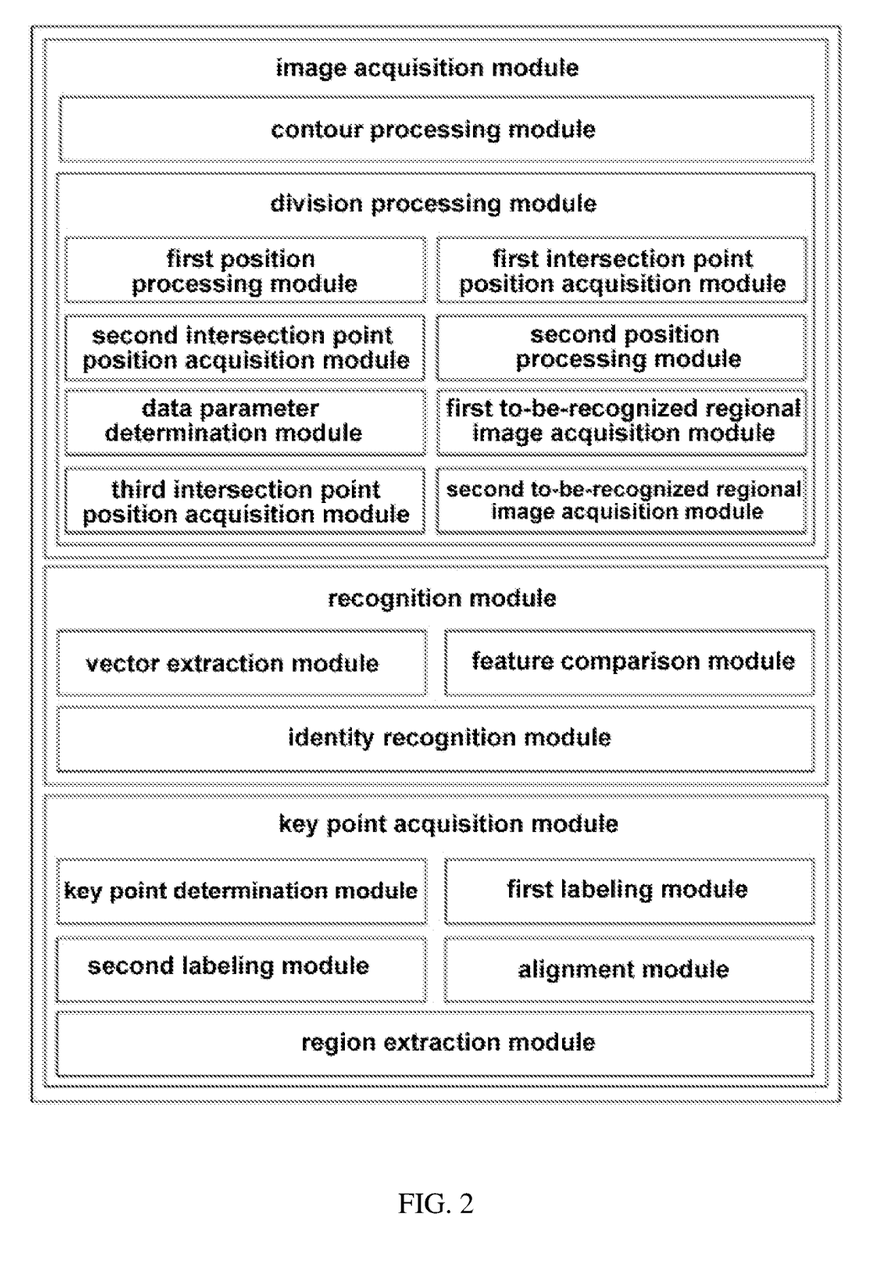
FIG. 2 is a system block diagram of a dog nose print recognition system according to the present disclosure.

An embodiment of the present disclosure proposes a dog nose print recognition system, as shown in FIG. 2, the dog nose print recognition system includes:

an image acquisition module, configured for collecting a nose image of a dog, acquiring the nose image, and processing the nose image to obtain a plurality of regional images to be recognized;

a key point acquisition module, configured for performing key point detection on the plurality of regional images to be recognized to obtain key points corresponding to the regional images to be recognized, and using the key points to perform alignment processing of the regional images to be recognized to obtain aligned regional images to be recognized; and a recognition module, configured for performing dog nose print feature vector extraction and recognition on the aligned regional images to be recognized, and determining a dog identity recognition result through the dog nose print feature vector extraction and recognition.

The working principle of the above technical solution is as follows: firstly, an image acquisition module is used to collect a nose image of a dog, acquire the nose image, and process the nose image to obtain a plurality of regional images to be recognized; then, a key point acquisition module is utilized to perform key point detection on the plurality of regional images to be recognized to obtain key points corresponding to the regional images to be recognized, and use the key points to perform alignment processing of the regional images to be recognized to obtain aligned regional images to be recognized; finally, a recognition module is adopted to perform dog nose print feature vector extraction and recognition on the aligned regional images to be recognized, and determine a dog identity recognition result through the dog nose print feature vector extraction and recognition.

The effect of the above technical solution is: the dog nose print recognition system proposed in this embodiment extracts a key recognition region of the dog's nose by setting a plurality of regions to be recognized, and realizes recognition and detection of dog nose print by recognizing and detecting partial features of the key recognition region. In this way, it can effectively improve the accuracy and efficiency of dog image recognition while reducing the amount of data to be detected.

In one embodiment of the present disclosure, the image acquisition module comprises:

a contour processing module, configured for performing an edge contour process to the nose image to obtain a nose overall region bounded by a nose contour;

a division processing module, configured for performing an image region division process to the nose overall region to obtain the plurality of regional images to be recognized.

Herein, the division processing module comprises:

a first position processing module, configured for recognizing and marking contour lines of a left nostril and a right nostril in the nose overall region to obtain a position of a contour line of the left nostril and a position of a contour line of the right nostril, and a center line between the left nostril and the right nostril, and taking the center line between the left nostril and the right nostril as a center line of the nose overall region;

a first intersection point position acquisition module, configured for lining a highest point of the contour line of the left nostril with a highest point of the contour line of the right nostril to obtain a horizontal higher line, and extracting a position of an intersection point of the horizontal higher line and the center line of the nose overall region as a first intersection point position;

a second intersection point position acquisition module, configured for extracting a position of an intersection point of the center line of the nose overall region and an upper contour line of the nose overall region as a second intersection point position;

a second position processing module, configured for lining the highest point of the contour line of the left nostril and the highest point of the contour line of the right nostril with the second intersection point position respectively, to respectively obtain an included angle between a line connecting the highest point of the contour line of the left nostril with the second intersection point position and the horizontal higher line, and an included angle between a line connecting the highest point of the contour line of the right nostril with the second intersection point position and the horizontal higher line;

a data parameter determination module, configured for utilizing the included angles and a center point-included angle determination model to obtain a position of a center point on the center line of the nose overall region; simultaneously, utilizing a distance between the first intersection point position and the second intersection point position in conjunction with a radius determination model to obtain a radius, wherein the center point-included angle determination model and the radius determination model are as follows respectively:

$$V = \left(1 - \frac{\min(\alpha_1, \alpha_2) - \alpha_0}{\max(\alpha_1, \alpha_2) - \alpha_0}\right) \cdot \frac{\min(\alpha_1, \alpha_2)}{1.29 \cdot \max(\alpha_1, \alpha_2)} \cdot \left(\alpha_1 + \frac{\min(\alpha_1, \alpha_2) - \alpha_0}{\alpha_0} \cdot \alpha_2\right)$$

$$R = \left(1 + \frac{\min(\alpha_1, \alpha_2)}{1.34 \cdot \max(\alpha_1, \alpha_2)}\right) \cdot L$$

wherein V represents an included angle between a line connecting the center point with the highest point of the contour line of the left nostril or the highest point of the contour line of the right nostril and the horizontal higher line; $\alpha_1$ and $\alpha_2$ respectively represent the included angle between the line connecting the highest point of the contour line of the left nostril with the second intersection point position and the horizontal higher line, and the included angle between the line connecting the highest point of the contour line of the right nostril with the second intersection point position and the horizontal higher line; $\alpha_0$ represents a benchmark comparison value of included angle with a value range of 17.8°-25.2°; and if $\alpha_1$ and $\alpha_2$ are equal, then $(\min(\alpha_1, \alpha_2)-\alpha_0)/(\max(\alpha_1, \alpha_2)-\alpha_0)=0.1$; R represents the radius; L represents the first the distance between the first intersection point position and the second intersection point position;

a first to-be-recognized regional image acquisition module, configured for taking the center point as a circle center to form a first region to be recognized based on the radius, and utilizing the first region to be recognized to intercept a first regional image to be recognized in the nose overall region;

a third intersection point position acquisition module, configured for lining a lowest point of the contour line of the left nostril with a lowest point of the contour line of the right nostril to obtain a horizontal lower line, and extracting a position of an intersection point of the horizontal lower line and the center line of the nose overall region as a third intersection point position;

a second to-be-recognized regional image acquisition module, configured for extracting a shortest distance between the lowest point of the contour line of the left nostril and the center line of the nose overall region and a shortest distance between the lowest point of the contour line of the right nostril and the center line of the nose overall region, respectively; taking the third intersection point position as a circle center, taking the shortest distance between the lowest point of the contour line of the left nostril and the center line of the nose overall region as a major axis and taking the shortest distance between the lowest point of the contour line of the right nostril and the center line of the nose overall region as a minor axis, to form a longitudinal elliptical region, utilizing the longitudinal elliptical region as a second region to be recognized, and utilizing the second region to be recognized to intercept a second regional image to be recognized in the nose overall region.

The working principle of the above technical solution is as follows: firstly, a contour processing module is used to perform an edge contour process to the nose image to obtain a nose overall region bounded by a nose contour; finally, a division processing module is utilized to perform an image region division process to the nose overall region to obtain the plurality of regional images to be recognized.

Herein, the operation process of the division processing module includes:

firstly, a first position processing module is used to recognize and mark contour lines of a left nostril and a right nostril in the nose overall region to obtain a position of a contour line of the left nostril and a position of a contour line of the right nostril, and a center line between the left nostril and the right nostril, and take the center line between the left nostril and the right nostril as a center line of the nose overall region; then, a first intersection point position acquisition module is utilized to line a highest point of the contour line of the left nostril with a highest point of the contour line of the right nostril to obtain a horizontal higher line, and extract a position of an intersection point of the horizontal higher line and the center line of the nose overall region as a first intersection point position; then, a second intersection point position acquisition module is adopted to extract a position of an intersection point of the center line of the nose overall region and an upper contour line of the nose overall region as a second intersection point position; then, a second position processing module is utilized to line the highest point of the contour line of the left nostril and the highest point of the contour line of the right nostril with the second intersection point position respectively, to respectively obtain an included angle between a line connecting the highest point of the contour line of the left nostril with the second intersection point position and the horizontal higher line, and an included angle between a line connecting the highest point of the contour line of the right nostril with the second intersection point position and the horizontal higher line; then, a data parameter determination module is adopted to utilize the included angles and a center point-included angle determination model to obtain a position of a center point on the center line of the nose overall region; simultaneously, utilize a distance between the first intersection point position and the second intersection point position in conjunction with a radius determination model to obtain a radius; then, a first to-be-recognized regional image acquisition module is adopted to take the center point as a circle center to form a first region to be recognized based on the radius, and utilize the first region to be recognized to intercept a first regional image to be recognized in the nose overall region; then a third intersection point position acquisition module is adopted to line a lowest point of the contour line of the left nostril with a lowest point of the contour line of the right nostril to obtain a horizontal lower line, and extract a position of an intersection point of the horizontal lower line and the center line of the nose overall region as a third intersection point position; finally, a second to-be-recognized regional image acquisition module is utilized to extract a shortest distance between the lowest point of the contour line of the left nostril and the center line of the nose overall region and a shortest distance between the lowest point of the contour line of the right nostril and the center line of the nose overall region, respectively; take the third intersection point position as a circle center, take the shortest distance between the lowest point of the contour line of the left nostril and the center line of the nose overall region as a major axis and take the shortest distance between the lowest point of the contour line of the right nostril and the center line of the nose overall region as a minor axis, to form a longitudinal elliptical region, utilize the longitudinal elliptical region as a second region to be recognized, and utilize the second region to be recognized to intercept a second regional image to be recognized in the nose overall region.

The effect of the above-mentioned technical solution is: the representativeness and accuracy of image acquisition of the plurality of regional images to be recognized of the dog nose print can be effectively improved through the above-mentioned method, and in this way, the amount of the data to be detected (feature vectors and key points) can be effectively reduced, and the efficiency of data detection can be effectively improved through the reduction of the amount of data, and the problem of low response speed of dog nose print recognition caused by too much data to be detected and compared can be prevented. Further, the positions obtained by the above formula and method can effectively improve its versatility for the shape and size of any dog's nose, and can ensure that the regional images to be recognized with high accuracy and rationality can be obtained for any dog's nose shape and size, and the regional images to be recognized contain a sufficient amount of data (feature vectors and key points) that represent the characteristic of the dog nose print, which can effectively improve the accuracy of dog nose print recognition while reducing the amount of data to be processed.

In one embodiment of the present disclosure, the key point acquisition module comprises:

a key point determination module, configured for inputting the plurality of regional images to be recognized into a trained key point detection model in sequence to obtain key points corresponding to the regional image to be recognized;

a first labeling module, configured for marking the key points corresponding to each regional image to be recognized with a regional label to obtain the key points with the regional label corresponding to the regional image to be recognized;

a region extraction module, configured for extracting a preset key point reference region corresponding to the regional image to be recognized, wherein the key point reference region has the same label as the regional label;

a second labeling module, configured for planning the regional image to be recognized with the key points with the regional label to the key point reference region with the same regional label, according to a principle of regional label consistency;

an alignment module, configured for aligning the key points corresponding to the regional image to be recognized with key point reference positions contained in the corresponding key point reference region, and aligning the plurality of regional images to be recognized to standard positions of the regional images to be recognized by means of aligning the key points with the key point reference positions.

The working principle of the above technical solution is as follows: firstly, a key point determination module is used to input the plurality of regional images to be recognized into a trained key point detection model in sequence to obtain key points corresponding to the regional image to be recognized; then a first labeling module is utilized to mark the key points corresponding to each regional image to be recognized with a regional label to obtain the key points with the regional label corresponding to the regional image to be recognized; then a region extraction module is adopted to extract a preset key point reference region corresponding to the regional image to be recognized, wherein the key point reference region has the same label as the regional label; then, a second labeling module is adopted to plan the regional image to be recognized with the key points with the regional label to the key point reference region with the same regional label, according to a principle of regional label consistency; finally, an alignment module is utilized to align the key points corresponding to the regional image to be recognized with key point reference positions contained in the corresponding key point reference region, and align the plurality of regional images to be recognized to standard positions of the regional images to be recognized by means of aligning the key points with the key point reference positions.

The effect of the above technical solution is: the above method can effectively improve the accuracy and image recognition efficiency of dog image recognition while reducing the amount of data to be detected.

In one embodiment of the present disclosure, the recognition module comprises:
- a vector extraction module, configured for inputting the aligned regional images to be recognized into a trained feature extraction model to extract a dog nose print feature vector, to obtain a nose print feature vectors of a dog to be tested;
- a feature comparison module, configured for comparing the nose print feature vector of the dog to be tested with a reference dog nose print feature vector stored in a preset dog nose print feature vector library in terms of distance, and taking the reference dog nose print feature vector with closest distance to the nose print feature vector of the dog to be tested as a target dog nose print feature vector;
- an identity recognition module, configured for selecting the target dog nose print feature vector, and retrieving a dog identity information corresponding to the target dog nose print feature vector from the dog nose print feature vector library.

The working principle of the above technical solution is as follows: firstly, a vector extraction module is adopted to input the aligned regional images to be recognized into a trained feature extraction model to extract a dog nose print feature vector, to obtain a nose print feature vectors of a dog to be tested; then, a feature comparison module is utilized to compare the nose print feature vector of the dog to be tested with a reference dog nose print feature vector stored in a preset dog nose print feature vector library in terms of distance, and take the reference dog nose print feature vector with closest distance to the nose print feature vector of the dog to be tested as a target dog nose print feature vector; finally, an identity recognition module is utilized to select the target dog nose print feature vector, and retrieve a dog identity information corresponding to the target dog nose print feature vector from the dog nose print feature vector library.

The effect of the above technical solution is: the above method can effectively improve the accuracy and image recognition efficiency of dog image recognition while reducing the amount of data to be detected.

Obviously, various changes and modifications may be made to the present disclosure by those skilled in the art, without departing from the spirit and scope of the present disclosure. Thus, if these modifications and variations of the present disclosure fall within the scope of the claims of the present disclosure and their equivalent technologies, then the present disclosure also intends to include these modifications and variations.

What is claimed is:

1. A dog nose print recognition method, comprising:
collecting a nose image of a dog, acquiring the nose image, and processing the nose image to obtain a plurality of regional images to be recognized;
performing key point detection on the plurality of regional images to be recognized to obtain key points corresponding to the regional images to be recognized, and using the key points to perform alignment processing of the regional images to be recognized to obtain aligned regional images to be recognized; and
performing dog nose print feature vector extraction and recognition on the aligned regional images to be recognized, and determining a dog identity recognition result through the dog nose print feature vector extraction and recognition,
wherein the step of processing the nose image to obtain a plurality of regional images to be recognized comprises:
performing an edge contour process to the nose image to obtain a nose overall region bounded by a nose contour;
performing an image region division process to the nose overall region to obtain the plurality of regional images to be recognized, comprising:
recognizing and marking contour lines of a left nostril and a right nostril in the nose overall region to obtain a position of a contour line of the left nostril and a position of a contour line of the right nostril, and a center line between the left nostril and the right nostril, and taking the center line between the left nostril and the right nostril as a center line of the nose overall region;
lining a highest point of the contour line of the left nostril with a highest point of the contour line of the right nostril to obtain a horizontal higher line, and extracting a position of an intersection point of the horizontal higher line and the center line of the nose overall region as a first intersection point position;
extracting a position of an intersection point of the center line of the nose overall region and an upper contour line of the nose overall region as a second intersection point position;
lining the highest point of the contour line of the left nostril and the highest point of the contour line of the right nostril with the second intersection point position respectively, to respectively obtain an included angle between a line connecting the highest point of the contour line of the left nostril with the second intersection point position and the horizontal higher line, and an included angle between a line connecting the highest point of the contour line of the right nostril with the second intersection point position and the horizontal higher line;
utilizing the included angles and a center point-included angle determination model to obtain a position of a center point on the center line of the nose overall region; simultaneously, utilizing a distance between the first intersection point position and the second intersection point position in conjunction with a radius determination model to obtain a radius, wherein the center point-included angle determination model and the radius determination model are as follows respectively:

$$V = \left(1 - \frac{\min(\alpha_1, \alpha_2) - \alpha_0}{\max(\alpha_1, \alpha_2) - \alpha_0}\right) \cdot \frac{\min(\alpha_1, \alpha_2)}{1.29 \cdot \max(\alpha_1, \alpha_2)} \cdot \left(\alpha_1 + \frac{\min(\alpha_1, \alpha_2) - \alpha_0}{\alpha_0} \cdot \alpha_2\right)$$

$$R = \left(1 + \frac{\min(\alpha_1, \alpha_2)}{1.34 \cdot \max(\alpha_1, \alpha_2)}\right) \cdot L$$

wherein V represents an included angle between a line connecting the center point with the highest point of the contour line of the left nostril or the highest point of the contour line of the right nostril and the horizontal higher line; α1 and α2 respectively represent the included angle between the line connecting the highest point of the contour line of the left nostril with the second intersection point position and the horizontal higher line, and the included angle between the line connecting the highest point of the contour line of the right nostril with the second intersection point position and the horizontal higher line; $\alpha 0$ represents a benchmark comparison value of included angle with a value range of 17.8°-25.2°; and if $\alpha 1$ and $\alpha 2$ are equal, then $(\min(\alpha 1, \alpha 2)-\alpha 0)/(\max(\alpha 1, \alpha 2)-\alpha 0)=0.1$; R represents the radius; L represents the first the distance between the first intersection point position and the second intersection point position;

taking the center point as a circle center to form a first region to be recognized based on the radius, and utilizing the first region to be recognized to intercept a first regional image to be recognized in the nose overall region;

lining a lowest point of the contour line of the left nostril with a lowest point of the contour line of the right nostril to obtain a horizontal lower line, and extracting a position of an intersection point of the horizontal lower line and the center line of the nose overall region as a third intersection point position;

extracting a shortest distance between the lowest point of the contour line of the left nostril and the center line of the nose overall region and a shortest distance between the lowest point of the contour line of the right nostril and the center line of the nose overall region, respectively; taking the third intersection point position as a circle center, taking the shortest distance between the lowest point of the contour line of the left nostril and the center line of the nose overall region as a major axis and taking the shortest distance between the lowest point of the contour line of the right nostril and the center line of the nose overall region as a minor axis, to form a longitudinal elliptical region, utilizing the longitudinal elliptical region as a second region to be recognized, and utilizing the second region to be recognized to intercept a second regional image to be recognized in the nose overall region;

wherein the step of performing dog nose print feature vector extraction and recognition on the aligned regional images to be recognized, and determining a dog identity recognition result through the dog nose print feature vector extraction and recognition further comprises:

inputting the aligned regional images to be recognized into a trained feature extraction model to extract a dog nose print feature vector, to obtain a nose print feature vectors of a dog to be tested;

comparing the nose print feature vector of the dog to be tested with a reference dog nose print feature vector stored in a preset dog nose print feature vector library in terms of distance, and taking the reference dog nose print feature vector with closest distance to the nose print feature vector of the dog to be tested as a target dog nose print feature vector;

selecting the target dog nose print feature vector, and retrieving a dog identity information corresponding to the target dog nose print feature vector from the dog nose print feature vector library.

2. The dog nose print recognition method according to claim 1, wherein the step of performing key point detection on the plurality of regional images to be recognized to obtain key points corresponding to the regional images to be recognized, and using the key points to perform alignment processing of the regional images to be recognized to obtain aligned regional images to be recognized comprises:

inputting the plurality of regional images to be recognized into a trained key point detection model in sequence to obtain key points corresponding to the regional image to be recognized;

marking the key points corresponding to each regional image to be recognized with a regional label to obtain the key points with the regional label corresponding to the regional image to be recognized;

extracting a preset key point reference region corresponding to the regional image to be recognized, wherein the key point reference region has the same label as the regional label;

planning the regional image to be recognized with the key points with the regional label to the key point reference region with the same regional label, according to a principle of regional label consistency;

aligning the key points corresponding to the regional image to be recognized with key point reference positions contained in the corresponding key point reference region, and aligning the plurality of regional images to be recognized to standard positions of the regional images to be recognized by means of aligning the key points with the key point reference positions.

* * * * *